United States Patent [19]

Wayne et al.

[11] Patent Number: 4,623,277
[45] Date of Patent: Nov. 18, 1986

[54] SELF-TIGHTENING SHAFT COUPLER

[75] Inventors: Alex Wayne, Lexington, Tenn.;
Dennis W. Bintner, Des Moines,
Iowa; Mark H. Bartel, Lexington,
Tenn.

[73] Assignee: Delavan Inc., West De Moines, Iowa

[21] Appl. No.: 729,549

[22] Filed: May 1, 1985

[51] Int. Cl.⁴ .............................................. F16B 2/02
[52] U.S. Cl. ................................... 403/314; 403/370;
403/371; 464/182
[58] Field of Search .............. 403/314, 301, 307, 370,
403/371; 464/182

[56] References Cited

U.S. PATENT DOCUMENTS

| 726,336 | 4/1903 | Ott | 403/314 |
| 1,712,108 | 5/1929 | Goeller | 403/314 X |
| 1,769,101 | 7/1930 | Becker | 403/371 X |
| 2,151,831 | 3/1939 | Buccicone | 403/370 |
| 2,470,179 | 5/1949 | McCloskey | 403/370 |

Primary Examiner—Andrew V. Kundrat
Attorney, Agent, or Firm—Lockwood, Alex, FitzGibbon & Cummings

[57] ABSTRACT

A self-tightening shaft coupler includes a rigid, elongate coupling sleeve having an externally compressible collet threaded into each end. The collets engage the ends of the shafts which are to be joined such that the shafts are coupled to one another through the coupling sleeve. The threading of the collets and the coupling sleeve is such that rotation of the shafts in a predetermined direction tends to tighten the collets onto the shafts whereby self-tightening action is achieved.

20 Claims, 6 Drawing Figures

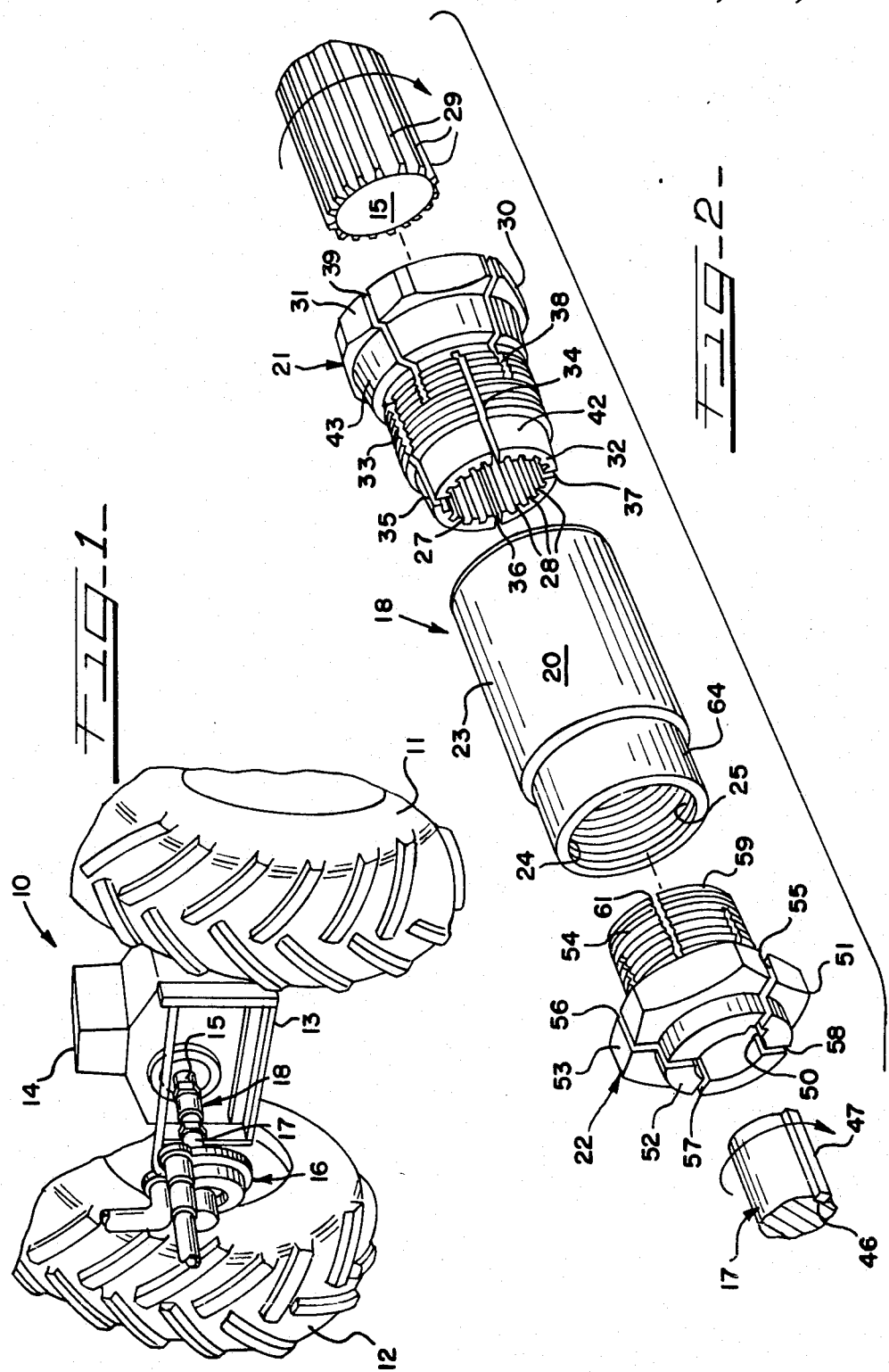

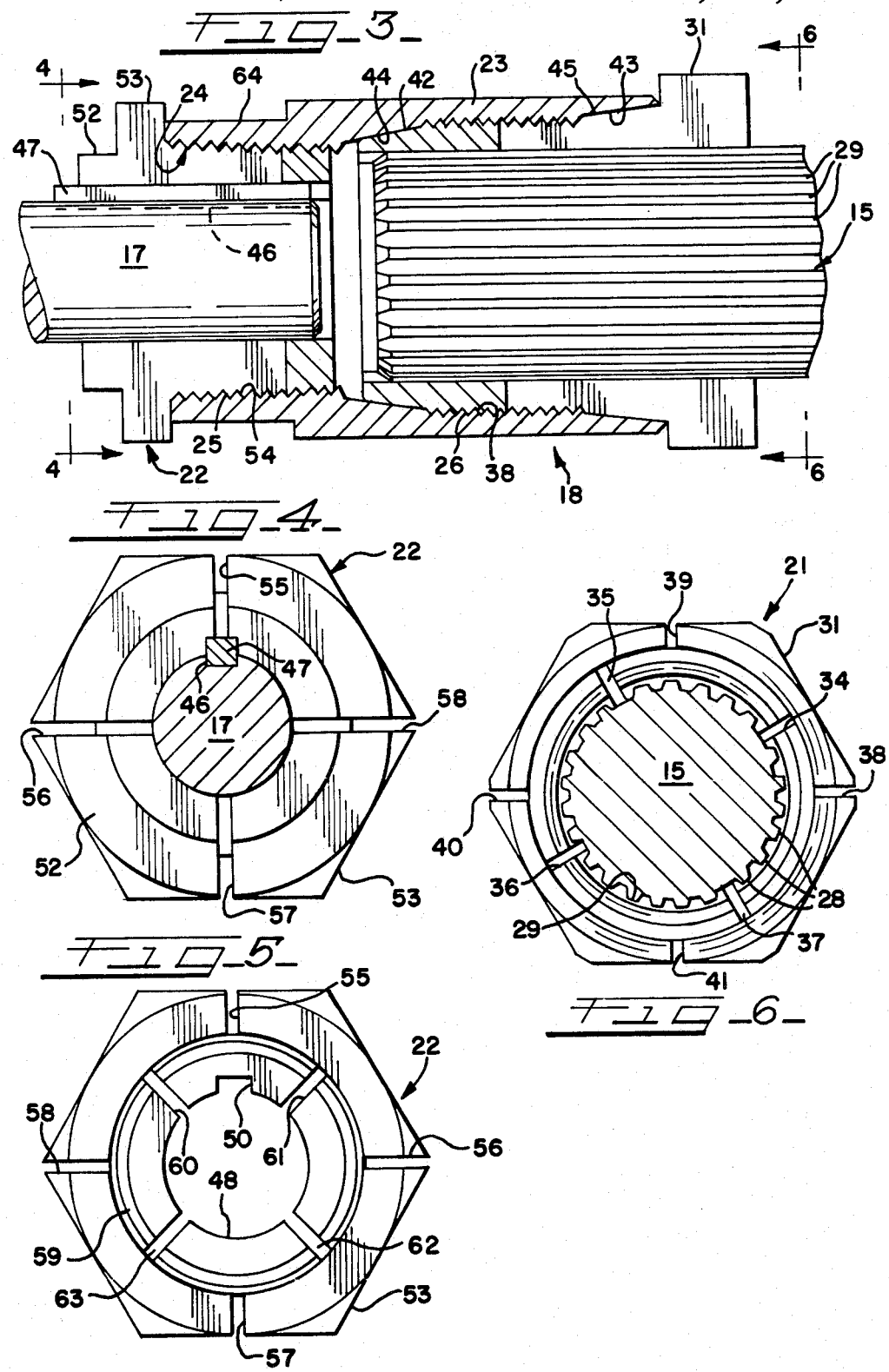

SELF-TIGHTENING SHAFT COUPLER

BACKGROUND OF THE INVENTION

This invention relates to shaft couplers and in particular to a self-tightening shaft coupler for conveniently, reliably, and safely joining a pair of axially aligned rotatable shafts.

The need to couple two axially aligned rotatable shafts arises frequently in a variety of diverse applications. For example, it is a common and well known practice to obtain operating power for operating various auxiliary agricultural devices, such as sprayers, spreaders and reapers, by coupling a drive shaft on the auxiliary device to the splined power take-off shaft of an agricultural tractor. To facilitate joining the shafts, a variety of shaft couplers have been developed which, in addition to providing an effective coupling, seek to provide reliability, safety and convenience as well.

One well known prior shaft coupler consisted of a generally cylindrical sleeve having an interior bore for receiving both the power take-off, and auxiliary device, shafts. A series of cam-actuated pins, encircling the sleeve, projected into a circumferential groove formed on the splined power take-off shaft to prevent relative axial movement between the coupler and the shaft. In order to help secure the coupler to the auxiliary device drive shaft, a set-screw was provided in the coupler and was arranged to engage, and bear against, the auxiliary drive shaft.

While this prior shaft coupler was effective when properly installed, the set-screw was subject to inadvertent loosening resulting in slippage of the coupler, scoring of the auxiliary device drive shaft, and potentially hazardous wobbling between the auxiliary device and the supporting power take-off shaft. Even when tight, the set-screw, in bearing against the auxiliary device shaft, unavoidably forced the shaft into slight axial misalignment with the coupler, which, in itself, was a source of vibration in the auxiliary unit. Such vibration contributed to reduced bearing life in the auxiliary unit and tended to promote loosening of the set-screw.

In addition to the foregoing, the set-screw of such prior shaft couplers often protruded from the exterior of the coupler and formed a potential hazard as the coupler rotated conjointly with the shafts. The mechanism for operating the cam-actuated locking pins may pose a similar hazard.

The present invention is directed to an improved shaft coupler which is convenient to use, reliable and safe in operation, and which avoids the drawbacks of prior couplers. The coupler includes a pair of externally threaded, compressable collets, at opposite ends of a rigid coupler member. The threads are formed such that rotation of the power take-off shaft tends to tighten the collets with the effect that self-tightening operation is obtained. Since the collets constrict evenly around the shafts they engage, no misalignment between the shafts results as the coupler tightens.

In one principal aspect of the present invention, a coupler for joining a pair of shafts in generally axial alignment includes a elongate coupler member and collet at one end of the member in threaded engagement therewith. The collet is provided with an interior recess for receiving and engaging one of the shafts in order to join the coupling member thereto. Means are provided at the other end of the coupling member to engage the remaining shaft and thereby join the coupling member thereto.

In another principal aspect of the present invention, the collet is rotatably received in the elongate coupler member such that the rotational position of the collet relative to the member determines the dimension of the interior recess formed therein. Thus, the collet constricts onto the shaft as the collet rotates relative to the coupling member.

In still another principal aspect of the present invention, an additional collet, for engaging the remaining one of the shafts, is provided at the other end of the coupling member.

In still another principal aspect of the present invention, the threading of the collets at each end of the coupling member is such that rotation of the shafts in a predetermined direction tends to tighten each of the collets onto the shaft it engages.

In still another principal aspect of the present invention, one of the collets includes axially extending grooves for receiving the splines of a splined shaft therein.

In still another principal aspect of the present invention, one of the collets includes an axially extending groove for receiving a key contained in a keyway formed in one of the shafts.

In still another principal aspect of the present invention, the elongate coupling member is a generally cylindrical hollow sleeve.

In still another principal aspect of the present invention, each of the collets is of a hexagonal cross-section over a portion of its exterior to facilitate tightening and loosening with a wrench.

In still another principal aspect of the present invention, at least one of the collets is provided with a tapered exterior surface for engaging the interior of the coupling member upon axial movement therein such that the dimension of the interior of the collet decreases upon movement of the collet into the coupling member.

In still another principal aspect of the present invention, at least one of the collets is provided with two of such tapered exterior surfaces.

These and other objects, features and advantages of the present invention will be clearly understood through consideration of the following detailed description.

BRIEF DESCRIPTION OF THE DRAWINGS

In the course of this description, reference will be frequently be made to the accompanying drawings in which:

FIG. 1 is a fraqmentary perspective view of the rear of an agricultural tractor having an agricultural spray pump coupled to the power take-off shaft thereof through a self-tightening coupler constructed in accordance with the invention.

FIG. 2 is an exploded perspective view of the self-tightening coupler illustrated in FIG. 1.

FIG. 3 is a cross-sectional side view of the coupler illustrated in FIG. 2 showing the coupler joining two axially aligned shafts.

FIG. 4 is a cross-sectional view of the coupler illustrated in FIG. 3 taken along line 4—4 thereof, showing one end of a collet in which a keyed shaft is received.

FIG. 5 is an end view of the collet shown in FIG. 4, showing the opposite end thereof.

FIG. 6 is a cross-sectional view, taken along line 6—6 of FIG. 3, showing a splined collet and a splined shaft received therein.

DETAILED DESCRIPTION OF THE PREFERRED EMBODIMENT

Referring to the drawings, and in particular to FIG. 1, the rear of an agricultural tractor 10 is illustrated, which, in accordance with conventional practice, includes a pair of rear wheels 11 and 12 and a frame 13 therebetween. Frame 13 supports a power take-off unit 14 which is mechanically coupled to the vehicle's prime mover (not shown) and includes a rearwardly projecting power take-off (PTO) shaft 15 for providing power for operating a variety of auxiliary attachments such as an agricultural spray pump 16. Spray pump 16 is positioned adjacent PTO shaft 15 and includes an auxiliary unit drive shaft 17 in generally axial alignment therewith. Shafts 15 and 17 are coupled for co-rotation with one another by means of a self-tightening shaft coupler 18 constructed in accordance with the invention. Shaft coupler 18 performs the additional function of physically supporting spray pump 16 adjacent the rear of tractor 10.

The construction of shaft coupler 18 is illustrated in FIGS. 2-6. As illustrated therein, coupler 18 comprises an elongate coupler member 20 having a pair of collets 21 and 22 threaded into each end thereof. Coupler member 20 comprises a rigid, hollow, generally cylindrical sleeve and is preferably machined from a suitable durable material such as steel. Preferably, the exterior 23 of coupler member sleeve 20 is smooth and free of protuberances as shown. A circular cross-sectioned bore 24 extends axially through sleeve 20 from one end to the other, and is provided with internal threads 25 and 26 (FIG. 3) at each end for engaging complimentary threads formed on collets 21 and 22.

As illustrated, collet 21 is adapted to engage splined PTO shaft 15. To this end, collet 21 includes an interior recess 27 extending therethrough having a plurality of parallel, axially extending grooves 28 formed therein, which are dimensioned to receive corresponding splines 29 extending axially along the exterior of PTO shaft 15.

Adjacent its outer end 30, the exterior of collet 21 is of hexagonal cross-section over a portion 31 of its length to enable the collet to be twisted by means of a wrench. Toward its inner end 32, collet 21 is of generally circular cross-section and is dimensioned to be received in the interior bore 24 of sleeve 20. A portion 33 of the collet exterior is externally threaded to engage interior threads 26 of bore 24.

Adjacent inner end 32, collet 21 includes four axially extending slots 34-37 through the sidewall thereof each having a length of approximately two-thirds the total length of collet. Slots 34-37 are spaced equally around the circumference of the collet. Four additional slots 38-41 are provided through the sidewall of the collet adjacent the outer end 30 thereof and are oriented to lie substantially midway between each of the slots 34-37.

The exterior of collet 21 is tapered adjacent inner end 32 to form a conical ramped surface 42 as illustrated in FIGS. 2 and 3. As shown therein, the exterior dimension of the collet is smallest at the extreme inner end, and steadily increases toward the outer end until threads 33 begin. The threaded region 33 is of constant diameter and extends over approximately one-third the length of the collet. Beyond threaded region 33, in a direction toward outer end 30, a second conical ramped surface 43 is formed on the exterior of collet 21 and terminates adjacent the hexagonal region 31.

Referring to FIG. 3, bore 24 of coupler member sleeve 20 includes conical ramped surfaces 44 and 45 located on opposite sides of threads 26, which are shaped and spaced to engage ramped surfaces 42 and 43 respectively as collet 21 is threaded into the sleeve. When collet 21 is rotated in one direction relative to sleeve 20, the collet moves into the sleeve in a direction parallel to the longitudinal axis thereof with the result that surfaces 42 and 43 are each driven into increasingly narrower portions of the sleeve interior with the further result that the collet is externally compressed. By reason of slots 34-41, the dimension of interior recess 27 within collet 21 decreases as the collet is threaded into the sleeve with the result that the collet constrictingly engages PTO shaft 15 therein. The dimension of interior recess 27, and the degree to which the collet is constricted, depends on the rotational position of the collet within the threaded bore 24 of sleeve 20.

Referring further to FIGS. 2 and 3, collet 22 is similar in construction and operation to collet 21 and is also formed of a durable material such as steel. Collet 22 is adapted to engage the auxiliary unit drive shaft 17 which, in the example illustrated, is of smaller diameter than PTO shaft 15. Unlike the splined exterior of PTO shaft 15, the exterior of the auxiliary unit shaft 17 is smooth and is provided with a rectangular sectioned, axially extending keyway 46 along its exterior. In accordance with conventional practice, a rectangular sectioned key 47 is received in keyway 46.

Collet 22 includes a generally circular cross-sectioned interior recess 48, extending axially therethrough, in which shaft 17 can be received. A rectangular sectioned keyway 50 is formed axially along the interior recess 48 and is dimensioned to snugly receive key 47 when the end of shaft 17 is inserted into collet 22.

At its outer end 51, collet 22 includes a generally cylindrical raised region 52 which fits within a cylindrical recess (not shown) formed in the housing of spray pump 16 around shaft 17. To permit collet 22 to be twisted with a wrench, a hexagonal cross sectioned region 53 is formed adjacent the cylindrical region 52. Opposite cylindrical region 52, the exterior of collet 22 is externally threaded to form a threaded region 54 for engaging the complimentary internal threads 25 of sleeve 20.

As illustrated in FIGS. 2, 4, and 5, four parallel slots 55-58 are formed through the sidewall of collet 22 and extend from the outer end 51 of the collet toward the inner end 59 thereof. The length of each slot is approximately equal to two-thirds the length of collet 22. Similarly, four additional slots 60-63 extend axially through the collet sidewall from inner end 59 to a point adjacent the hexagonal region 53. Slots 55-58 and 60-63 are each equally circumferentially spaced around the collet and are oriented such that slots 60-63 interleave with slots 55-58.

As shown in FIG. 3, threaded region 54 of collet 22 covers substantially the entire region between hexagonal region 53 and inner end 59 of the collet. As further illustrated in FIG. 3, bore 24 of sleeve 20 is tapered over the region containing interior threads 25 into which collet 22 is threaded. This region of bore 24 is widest adjacent the end of sleeve 20 and narrows toward the center of the sleeve. Accordingly, as collet 22 is threaded into sleeve 20, the collet is externally compressed. Slots 55-58 and 60-63 permit compression of the collet with the result that the dimension of the interior recess 48 is reduced. Thus, upon rotation of the collet relative to the sleeve, collet 22 constrictingly engages auxiliary unit shaft 17.

As illustrated in FIG. 4, slots 55-58 and 60-63 are positioned such that one of the slots, e.g. slot 55, extends into keyway 50. Thus, as the collet constricts, the width of the keyway is reduced with the effect that the key 47 is clamped firmly in place.

In accordance with one principal aspect of the present invention, the threading of collets 21 and 22, as well as that of sleeve 20 which they engage, is such that rotation of the power take-off shaft 15 in a predetermined direction will result in further tightening of each of the collets onto its respective shaft. For example, in FIG. 2, PTO shaft 15 rotates in a clockwise direction (shown by arrow) when viewed from the rear of the tractor 10 (FIG. 1). Accordingly, collets 21 and 22 are each provided with left-hand threads such that the rotation of the PTO shaft 15, and the resistance offered by auxiliary unit shaft 17, will tend to drive each of the collets further into sleeve 20 with the further result that each collet tends to tighten onto its respective shaft. When the collets are firmly received in sleeve 20, shafts 15 and 17 are effectively coupled to one another therethrough such that shafts 15 and 17, together with collets 21 and 22, and sleeve 20, rotate conjointly as a unit. Thus, coupler 18 tends to self tighten with continued use.

Since each of the collets, as well as sleeve 20, are symmetrical around a common central axis, each collet constricts evenly onto its respective shaft as it tightens, with the result that misalignment of the shafts is avoided. Furthermore, since the actual dimension of the interior recesses 27 and 48, in collets 21 and 22 respectively, are determined by the rotational and axial positions of collets in the sleeves, each collet will snugly engage the shaft which it receives despite any deviation in actual shaft dimension from nominal standards, such as might result from wear or manufacturing irregularities.

When it is desired to uncouple shafts 15 and 17, collets 21 and 22 can each be grasped with a wrench adjacent the hexagonal regions 31 and 53 and thereafter backed away from sleeve 20. To provide adequate wrench clearance adjacent the hexagonal region 53 of collet 22, the exterior 23 of sleeve 20 is of reduced diameter over a portion 64 of its length adjacent the end of the sleeve in which collet 22 is received. Since the hexagonal region of collet 21 is greater than the exterior dimension of sleeve 20, it is not necessary to reduce the diameter of sleeve 20 adjacent collet 21.

It will be apparent that the shaft coupler construction described herein results in a shaft coupler which self tightens during use such that inadvertent loosening is highly improbable and such that shaft misalignment is avoided. Furthermore, since the exposed surfaces of sleeve 20 and collets 21 and 22 are each free of protuberances, the hazard posed by the coupler during high speed rotation is reduced.

While the shaft coupler described herein has been shown and described in conjunction with an agricultural tractor and spray pump, it will be appreciated that the coupler is well suited to a variety of applications wherein it is desired to couple two axially aligned shafts for rotation in predominately one predetermined direction. While the coupler shown and described is intended for use with shafts which rotate in the predetermined direction indicated by the arrows in FIG. 2, it will be appreciated that the principles of the present invention can be applied to couplers for joining shafts which rotate in a direction opposite to that shown, through the expedient of providing right-hand threads on collets 21 and 22 and in coupler sleeve 20.

It will also be appreciated that while the shapes and sizes of the shafts 15 and 17, collets 21 and 22, and sleeve 20 have been described in detail, the shapes and sizes of these members can deviate from those shown and described without departing from the invention in its broader aspects. Additionally, the shapes, sizes, and number of slots in collets 21 and 22 can be varied without departing from the invention.

While a particular embodiment of the invention has been shown and described, it will obvious to those skilled in the art that changes and modifications may be made therein without departing from the invention in its broader aspects, and, therefore, the aim in the apended claims is to cover all such changes and modifications as fall within the true spirit and scope of the invention.

We claim:

1. A coupler for joining a pair of rotatable shafts in generally axial alignment, comprising:
   an elongate coupler member;
   a collet at one end of said coupler member in threaded engagement therewith having an interior recess for receiving and engaging one of the shafts to join said coupler member thereto; and
   engaging means at the other end of said elongate coupler member for engaging the remaining one of the shafts to join said coupler member thereto, whereby the shafts are coupled to one another through said coupler member, said engaging means including threaded means for engaging said engaging means with said coupler member, the threaded engagement of said collet and said threaded means being such that rotation of one of said shafts in a predetermined direction tends to further engage said collet and said engaging means with the coupler member.

2. A coupler as defined in claim 1, wherein said collet is rotatably received in said elongate coupler member such that the rotational position of said collet relative to said coupler member determines the dimension of said interior recess and such that said collet constrictingly engages the shaft received in said interior recess in response to said rotation of said collet.

3. A coupler as defined in claim 2, wherein said means at the other end of said coupler member comprise an additional collet having an interior recess for engaging the remaining one of the shafts.

4. A coupler as defined in claim 3, wherein said additional collet threadingly engages said elongate coupler member such that rotation of said additional collet relative thereto results in constrictive engagement between said additional collet and the remaining one of the shafts.

5. A coupler as defined in claim 4, wherein the threading of said collets and said coupler member are such that rotation of one of the shafts in a predetermined direction tends toward further constriction of said collets onto the shafts.

6. A coupler as defined in claim 3, wherein said interior recess of one of said collets includes a plurality of axially extending grooves for receiving a plurality of splines formed on the shaft received therein.

7. A coupler as defined in claim 3, wherein said interior recess of said additional collet includes an axially extending groove for receiving a key engaging a keyway formed in the remaining one of the shafts.

8. A coupler as defined in claim 3, wherein said elongate coupler member is generally cylindrical.

9. A coupler as defined in claim 3, wherein each of said collets is of hexagonal cross section over a portion of its exterior.

10. A coupler as defined in claim 3, wherein at least one of said collets includes a tapered surface for engaging said elongate coupler member upon axial movement of said collet into said member such that the dimension of said interior recess decreases upon axial movement of said collet into said coupler member.

11. A coupler as defined in claim 10, wherein said collet includes two of said tapered surfaces.

12. A coupler as defined in claim 10, wherein said other collet is tapered such that axial movement of said collet into said coupler member reduces the dimension of said interior recess provided therein.

13. A self-tightening coupler for joining a pair of shafts for co-rotation with one another, comprising:

an elongate sleeve having an internally threaded bore at each end thereof;

a first collet defining a first interior recess for receiving the end of one of the shafts therein, said first collet being rotatably received in one of said internally threaded bores for movement along the axis of said sleeve in response to rotation of said first collet relative thereto such that the dimension of said first interior recess is determined by the axial position of said first collet within said sleeve; and a second collet defining a second interior recess for receiving the end of the other one of the shafts therein, said second collet being rotatably received in the other one of said internally threaded bores for movement along the axis of said sleeve in response to rotation of said second collet relative thereto;

said collets and said bores being arranged such that rotation of the shafts in a predetermined direction results in axial movement of said collets in a direction tending to reduce the dimensions of said first and second interior recesses, whereby said coupler self tightens on the shafts as the shafts rotate in said predetermined direction.

14. A coupler as defined in claim 13, wherein said first interior recess includes a plurality of axially extending grooves for receiving a plurality of splines formed on the shaft received therein.

15. A coupler as defined in claim 13, wherein said second interior recess includes an axially extending groove for receiving a key engaging a keyway formed in the remaining one of the shafts.

16. A coupler as defined in claim 13, wherein said elongate coupling member is generally cylindrical.

17. A coupler as defined in claim 13, wherein each of said collets includes a region of hexagonal cross section over a portion of its exterior.

18. A coupler as defined in claim 13, wherein said first collet includes at least one tapered surface for engaging said elongate sleeve upon axial movement of said collet into said sleeve such that the dimension of said first interior recess decreases upon axial movement of said first collet into said sleeve.

19. A coupler as defined in claim 18, wherein said first collet includes two of said tapered surfaces and said sleeve includes corresponding tapered surfaces for engaging said tapered surfaces on said first collet.

20. A coupler as defined in claim 19, wherein said second collet is tapered such that axial movement of said second collet into said sleeve reduces the dimension of said second interior recess.

* * * * *

UNITED STATES PATENT AND TRADEMARK OFFICE
CERTIFICATE OF CORRECTION

PATENT NO. : 4,623,277

DATED : November 18, 1986

INVENTOR(S) : Wayne et al.

It is certified that error appears in the above-identified patent and that said Letters Patent is hereby corrected as shown below:

In the Assignee portion of the heading on the cover page of the patent:

Delete "Inc." and insert --Inc--

Delete "De Moines" and insert --Des Moines--.

Signed and Sealed this

Eighteenth Day of August, 1987

Attest:

DONALD J. QUIGG

Attesting Officer

Commissioner of Patents and Trademarks